(12) United States Patent
Suzuki (10) Patent No.: US 9,695,931 B2
(45) Date of Patent: Jul. 4, 2017

(54) TRANSMISSION HYDRAULICS CONTROLLER

(71) Applicant: DENSO CORPORATION, Kariya, Aichi-pref. (JP)

(72) Inventor: Fuminori Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 103 days.

(21) Appl. No.: 14/952,853

(22) Filed: Nov. 25, 2015

(65) Prior Publication Data

US 2016/0153549 A1 Jun. 2, 2016

(30) Foreign Application Priority Data

Nov. 28, 2014 (JP) .................................. 2014-240912

(51) Int. Cl.
*F16H 61/32* (2006.01)
*F16H 61/02* (2006.01)
*F16H 61/00* (2006.01)

(52) U.S. Cl.
CPC ..... *F16H 61/0267* (2013.01); *F16H 61/0021* (2013.01); *F16H 61/32* (2013.01); *F16H 2061/326* (2013.01)

(58) Field of Classification Search
CPC .. F16H 31/0267; F16H 61/32; F16H 61/0021; F16H 2061/326
USPC .......................................... 475/117, 131, 133
See application file for complete search history.

(56) References Cited

U.S. PATENT DOCUMENTS

| 3,678,787 | A | * | 7/1972 | Ito | ........................... F16H 59/26 477/158 |
| 7,713,167 | B2 | * | 5/2010 | Yamamoto | ............ F16H 61/061 475/117 |
| 7,857,728 | B2 | * | 12/2010 | Tasaka | .................... F16H 61/12 477/115 |
| 2016/0033032 | A1 | * | 2/2016 | Takagi | ................ F16H 61/0031 475/117 |

FOREIGN PATENT DOCUMENTS

JP      2007-64268      3/2007

* cited by examiner

*Primary Examiner* — Roger Pang
(74) *Attorney, Agent, or Firm* — Nixon & Vanderhye PC (57) ABSTRACT

A pressure regulating passage includes a pressure regulating valve and a check valve. The pressure regulating valve regulates a hydraulic pressure supplied to a friction engagement element to be a predetermined pressure lower than an engagement pressure. The check valve prevents reverse flow of hydraulic oil supplied to the friction engagement element. An operative position of a manual valve is switched so as to switched between a passage that supplies hydraulic pressure to the hydraulic pressure supply passage while bypassing the pressure regulating passage and a passage that supplies hydraulic pressure to the hydraulic pressure supply passage through the pressure regulating passage. Accordingly, when an automatic transmission is in a D range and a vehicle is stopped, regardless of a line pressure, an N control process is performed to disengage the friction engagement element.

5 Claims, 7 Drawing Sheets

TRANSMISSION HYDRAULICS CONTROLLER

CROSS REFERENCE TO RELATED APPLICATION

The present application is based on Japanese Patent Application No. 2014-240912 filed on Nov. 28, 2014, disclosure of which is incorporated herein by reference.

TECHNICAL FIELD

The present disclosure relates to a hydraulics controller for a transmission that includes a manual valve and a hydraulic control valve. The manual valve switches a hydraulic circuit of hydraulic oil for friction engagement elements of the transmission. The hydraulic control valve controls a hydraulic pressure applied to the friction engagement elements.

BACKGROUND

JP 2007-064268 A describes an exemplary automatic transmission mounted on a vehicle. In this automatic transmission, an engine rotation-driven oil pump supplies a hydraulic pressure to a hydraulic control circuit. A hydraulic valve and a manual valve are provided in the hydraulic control circuit to switch a hydraulic circuit and to control a hydraulic pressure. Here, the hydraulic pressure is applied to friction engagement elements (e.g., a brake or a clutch) of a transmission mechanism. As a result, gear shifting, or range shifting, is performed.

This kind of automatic transmission includes a hydraulic control system. Specifically, when the vehicle is stopped while the transmission is in the D range (i.e., the drive range), the transmission is maintained in the first gear position (i.e., the gear position used for the vehicle to accelerate from standstill). To do so, a hydraulic control valve is controlled to maintain the hydraulic pressure applied on friction engagement elements, which are engaged during the first gear position of the transmission, at an engagement hydraulic pressure. Accordingly, the friction engagement elements are maintained in an engaged state.

However, when the vehicle is stopped while the transmission is in the D range, if the hydraulic control valve is controlled to maintain the hydraulic pressure applied on the friction engagement elements at the engagement hydraulic pressure such that the friction engagement elements are maintained in an engaged state for a long period of time, there is a concern that fuel consumption may worsen due to a large energy loss.

In this regard, when the vehicle is stopped while the transmission is in the D range, it is known that an N-control process may be performed to reduce the energy loss. Specifically, the N-control process controls the hydraulic control valve to reduce the hydraulic pressure applied to the friction engagement elements which are normally engaged during the first gear position of the transmission. As a result, the friction engagement elements become disengaged (in other words, the transmission switches to a neutral state).

SUMMARY

As mentioned above, the hydraulic control valve (which may be, for example, a solenoid valve) controls the hydraulic pressure applied to the friction engagement elements. However, even if the same electric current is applied to the hydraulic control valve, there is a phenomenon where the hydraulic pressure generated by the hydraulic control valve varies according to the line pressure.

Figure 7A:
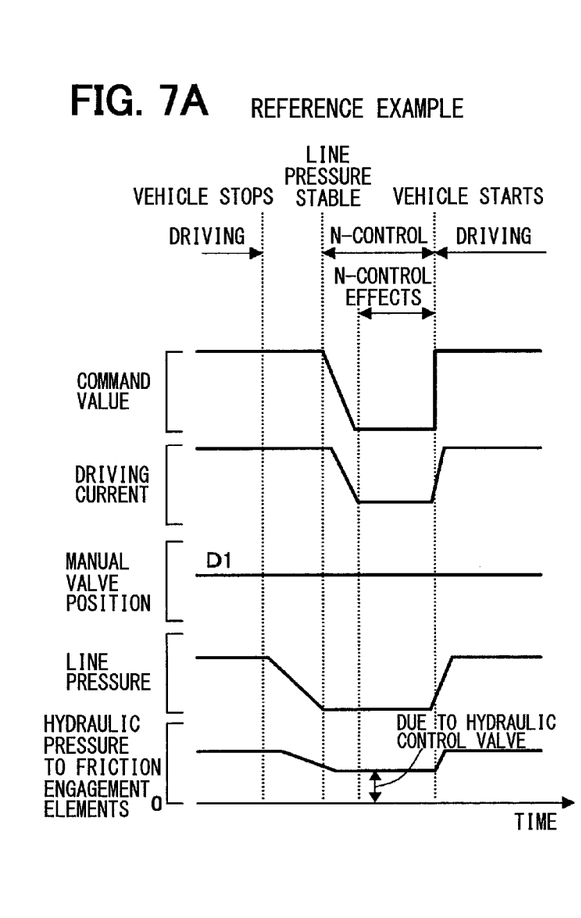
FIG. 7A is a time chart for explaining effects of a reference example.

FIG. 7A shows a reference example automatic transmission including a hydraulic control system in view of the above described phenomenon. Specifically, when a vehicle is stopped while a transmission is in the D range, the hydraulic control system waits until the line pressure stabilizes. Then, an N-control process is performed on a hydraulic control valve such that the hydraulic pressure applied to friction engagement elements is reduced and the friction engagement elements become disengaged. In this case, the start timing of the N-control process is delayed, and the friction engagement elements are maintained in the disengaged state for a reduced amount of time (i.e., the effects of the N-control process are conferred for a reduced amount of time). As a result, there is a concern that the N-control process may not sufficiently reduce energy losses.

Accordingly, it is an object of the present disclosure to provide a transmission hydraulics controller that, when a vehicle is stopped while a transmission is in a drive range, may quickly begin an N-control process to disengage friction engagement elements, thereby improving the reduction of energy losses by the N-control process.

In view of the above, the present disclosure provides a transmission hydraulics controller for a transmission including i) a manual valve that switches a hydraulic circuit for hydraulic oil of a friction engagement element of the transmission, ii) a hydraulic control valve that controls a hydraulic pressure applied to the friction engagement element, and iii) a range switch mechanism that is driven by an electric actuator and switches an operative position of the manual valve to switch a range of the transmission. The transmission hydraulics controller includes a hydraulic pressure supply passage that supplies hydraulic pressure to the friction engagement element through the hydraulic control valve, and a pressure regulating passage that includes i) a pressure regulating valve that regulates the hydraulic pressure supplied to the friction engagement element to be a predetermined pressure, the predetermined pressure being lower than an engagement pressure of the friction engagement element, and ii) a check valve that prevents reverse flow of hydraulic oil supplied to the friction engagement element. The operative position of the manual valve is switched so as to switch between a passage that supplies hydraulic pressure to the hydraulic pressure supply passage while bypassing the pressure regulating passage, and a passage that supplies hydraulic pressure to the hydraulic pressure supply passage through the pressure regulating passage.

According to this configuration, by switching to the passage that supplies hydraulic pressure to the hydraulic pressure supply passage while bypassing the pressure regulating passage, the hydraulic control valve is able to normally control the hydraulic pressure applied to the friction engagement element. Conversely, by switching to the passage that supplies hydraulic pressure to the hydraulic pressure supply passage through the pressure regulating passage, the friction engagement element may be disengaged by the pressure regulating valve, which regulates the hydraulic pressure applied to the friction engagement element to be the predetermined pressure which is lower than the engagement pressure. Accordingly, when the transmission is in the drive range and the vehicle stops, regardless of the line pressure, the control unit switches to the passage that supplies hydraulic pressure to the hydraulic pressure supply passage through the pressure regulating passage. Then, an N-control process may be performed, in which the pressure regulating valve regulates the hydraulic pressure applied to the friction engagement element to be the predetermined pressure which is lower than the engagement pressure, so as to disengage the friction engagement element. As a result, when the transmission is in the drive range and the vehicle stops, it is not necessary to wait for the line pressure to stabilize. Instead, the N control process, which disengages the friction engagement element, may be started early. Thus, the friction engagement element may be maintained in the disengaged state for an increased amount of time (i.e., the effects of the N-control process are conferred for an increased amount of time). As a result, reduction in energy losses by the N-control process may be improved.

Moreover, the electric actuator, which is a motive power source for the range switch mechanism, is used to switch the operative position of the manual valve to switch the passage that supplies hydraulic pressure to the hydraulic pressure supply passage. As a result, is not necessary to provide a dedicated motive power source for switching the passage that supplies hydraulic pressure to the hydraulic pressure supply passage, and the system may further satisfy low cost and energy efficiency demands.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Hereinafter, an embodiment which embodies the present disclosure will be explained in detail.

First, an outline configuration of a vehicular automatic transmission control system will be explained with reference to FIG. 1.

An output shaft (e.g., a crank shaft) of an engine 11, which is the power source of a vehicle, is coupled to an input shaft of an automatic transmission 12. The automatic transmission 12 includes a transmission gear mechanism (not illustrated) and a hydraulic control circuit 13. The transmission gear mechanism includes a plurality of friction engagement elements 48 (see FIGS. 4 and 5) such as a clutch or a brake for switching a gear position (i.e., a transmission gear ratio). Further, the hydraulic control circuit 13 includes hydraulic control valves 14 (e.g., solenoid valves) and a manual valve 17. The hydraulic control valves 14 control hydraulic pressure applied to the friction engagement elements 48. The manual valve 17 switches a hydraulic circuit for a hydraulic oil applied to the friction engagement elements 48. A range selector 15 is coupled to a range switch mechanism 16.

When the range selector 15 is operated, the range switch mechanism 16 drives the manual valve 17.

Further, the automatic transmission 12 includes an oil pump 34 (which may be, for example, a vane-type oil pump) that is rotatably driven by the engine 11 (e.g., driven by the rotation of the input shaft of the transmission gear mechanism). The hydraulic oil discharged by the oil pump 34 is supplied to the hydraulic control circuit 13, thereby supplying hydraulic pressure to the hydraulic control circuit 13.

An engine electronic control unit (ECU) 18 controls the engine 11. Specifically, the engine ECU 18 controls a throttle opening (i.e., an opening angle of a throttle valve) of a throttle device 20 and a fuel injection amount of a fuel injection valve 21 based on output signals such as an accelerator position (i.e., a depression amount of an accelerator pedal) detected by an accelerator sensor 19.

An automatic transmission ECU (AT-ECU) 22 controls a gear shift operation of the automatic transmission 12. Specifically, the AT-ECU 22 switches a gear position of the automatic transmission 12 to a target gear position by controlling each hydraulic control valve 14 in the hydraulic control circuit 13 to open and close, thereby controlling the hydraulic pressure applied to the friction engagement elements 48.

A shift-by-wire ECU (SBW-ECU) 23 controls a range switch operation of the automatic transmission 12. Specifically, the SBW-ECU 23 controls a motor 27 of the range switch mechanism 16 based on a requested range signal. The requested range signal corresponds to an operation of an operation lever 46 (i.e., an operation portion) of the range selector 15. Accordingly, the SBW-ECU 23 switches the manual valve 17 according to a range switch operation performed by a driver, thereby switching a shift range of the automatic transmission 12. The range selector 15, the range switch mechanism 16, and the SBW-ECU 23 form a shift-by-wire system.

The engine ECU 18, the AT-ECU 22, the SBW-ECU 23, and a notification device 25 are connected together by a communication line 26 such as an on-board local area network (LAN) circuit, and send and receive necessary information to each other through, e.g., controller area network (CAN) communication.

Figure 1:
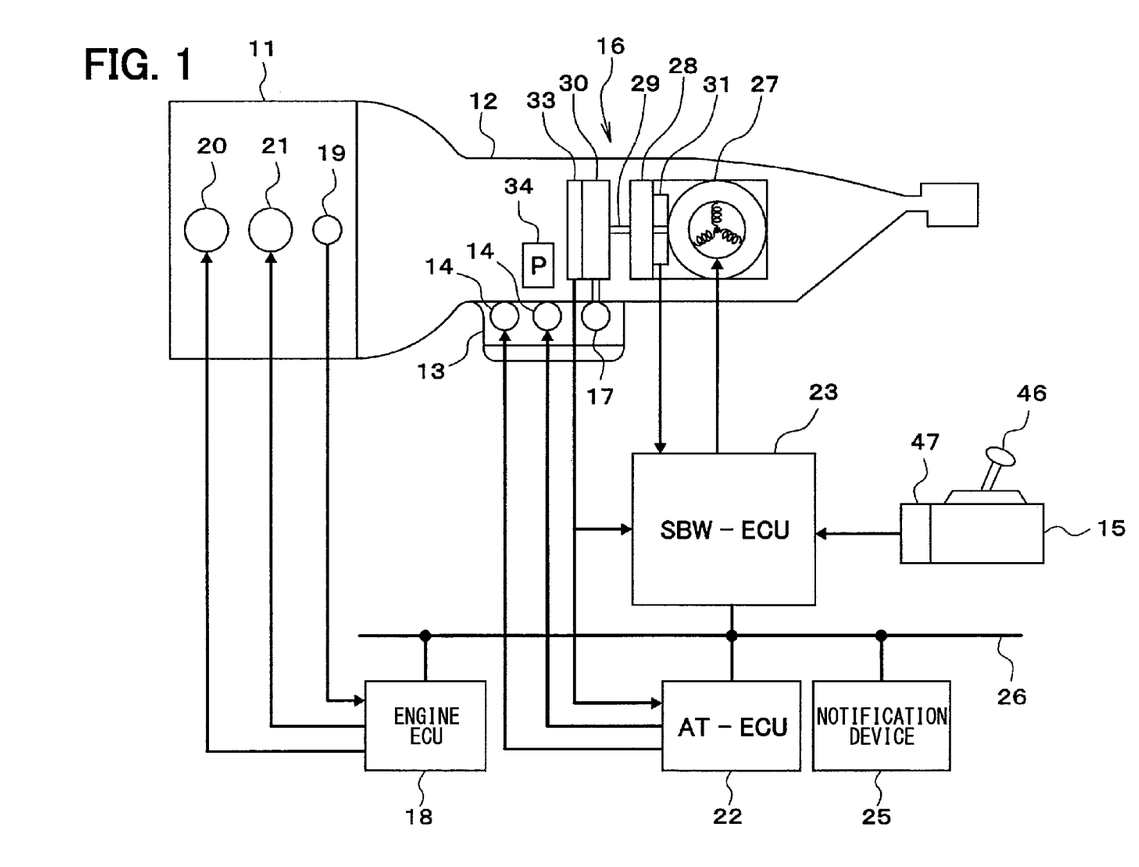
FIG. 1 is an outline view showing an automatic transmission control system of the present disclosure.
Figure 2:
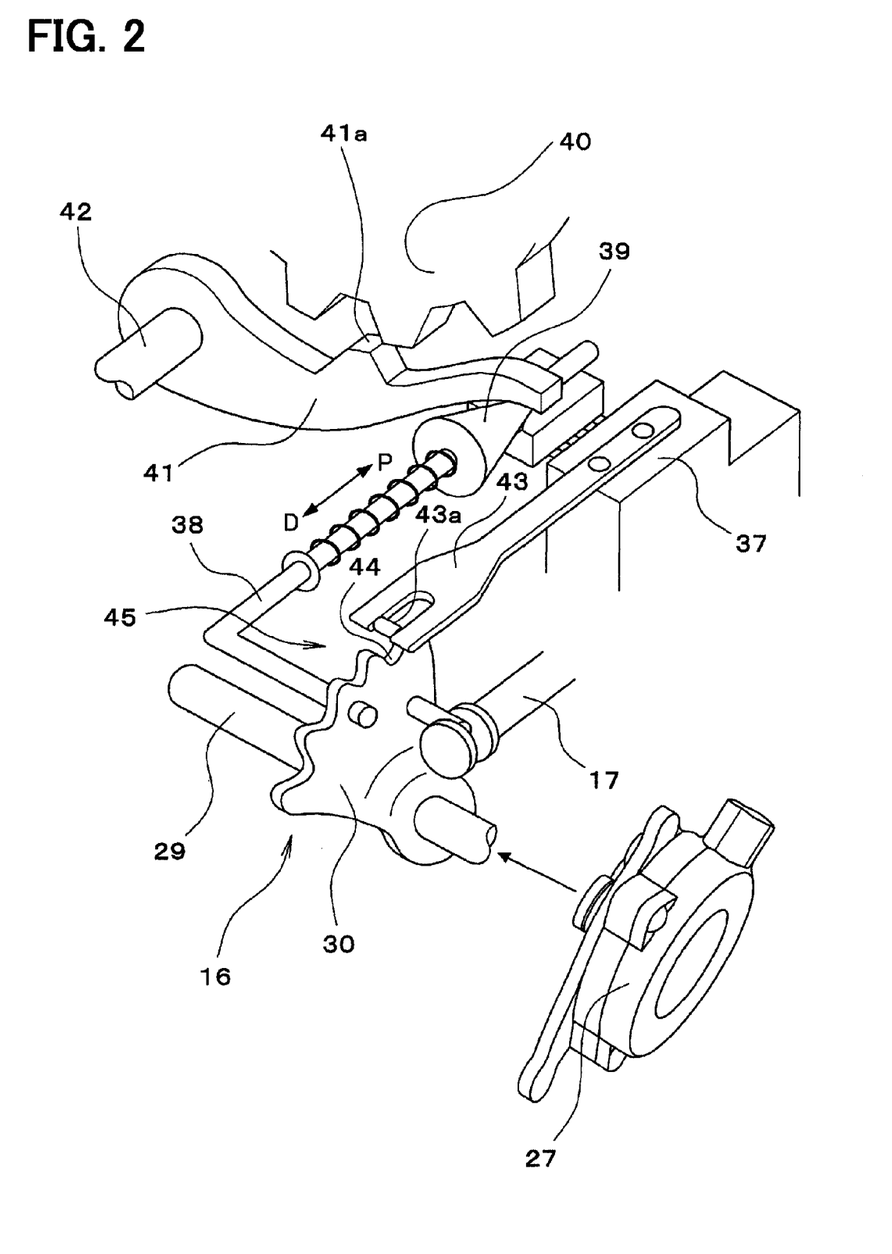
FIG. 2 is a perspective view showing a range switch mechanism.

As shown in FIG. 2, the range switch mechanism 16 may be a four-position type range switch mechanism that switches the shift range of the automatic transmission 12 between a P range (i.e., parking range), an R range (i.e., a reverse range), an N range (i.e., a neutral range), and a D range (i.e., a drive range). The motor 27, which is an electric actuator, acts as a motive power source for the range switch mechanism 16. The motor 27 may be, for example, a switched reluctance motor. A rotating shaft of the motor 27 is coupled to a manual shaft 29 through a reduction mechanism 28 (refer to FIG. 1). The manual shaft 29 is fixed to a detent lever 30. Further, the detent lever 30 is coupled to the manual valve 17. Here, the manual valve 17 is linearly displaced according to a rotation of the detent lever 30. The hydraulic circuit of the automatic transmission 12 is switched by the manual valve 17, thereby switching the shift range. According to the above, the shift range of the automatic transmission 12 may be controlled according to the rotation angle of the motor 27.

Further, an L-shaped parking rod 38 is fixed to the detent lever 30. A cone body 39 is disposed at the leading end of the parking rod 38, and abuts a lock lever 41. The lock lever 41 rotates about a shaft 42 according to the position of the cone body 39, thereby locking and unlocking a parking gear 40. The parking gear 40 is disposed in the automatic transmission 12, and when the parking gear 40 is locked with the lock lever 41, the driving wheels of the vehicle are held in a stopped state (i.e., a parking state).

A detent spring 43 is fixed to a support base 37 to retain the detent lever 30 in each of the P, R, N, and D ranges. Meanwhile, the detent lever 30 includes a plurality of range retention recesses 44 corresponding to each of the P, R, N, and D ranges. Further, in the present embodiment, the D range includes a D1 range and a D2 range, and the detent lever 30 includes a respective range retention recess 44 for each of the D1 range and the D2 range (refer to FIG. 3).

Figure 3:
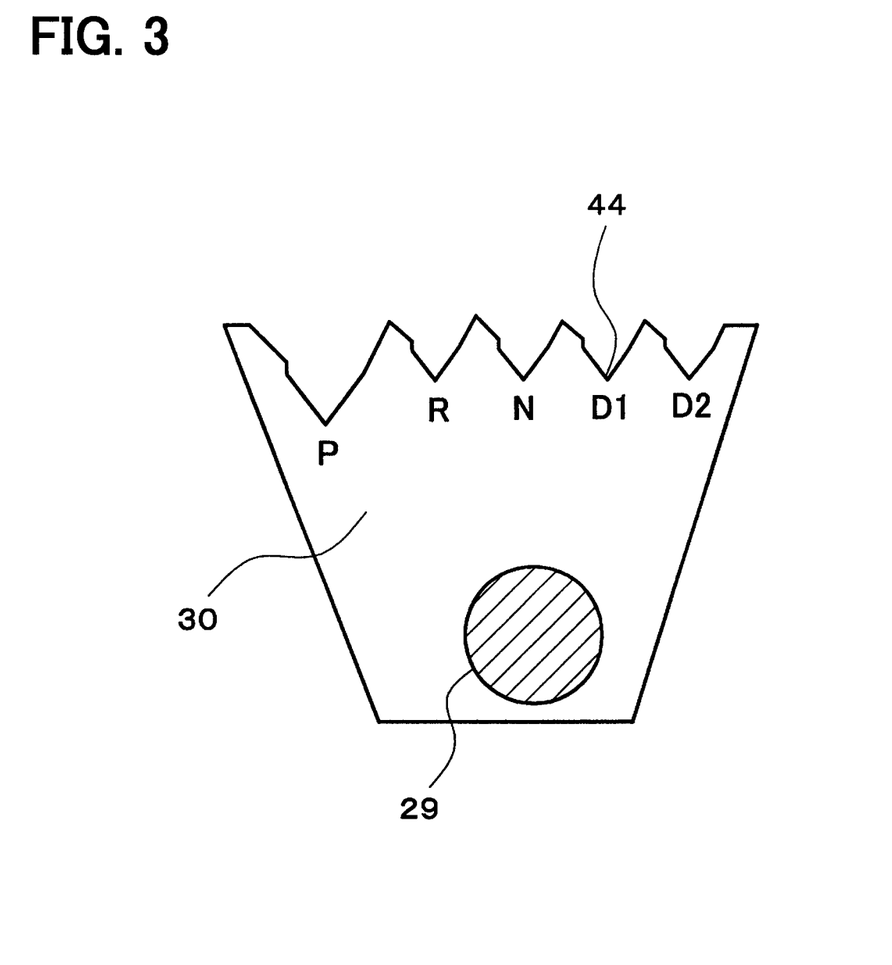
FIG. 3 is a front view showing a detent lever.

An engagement portion 43a is provided at the tip of the detent spring 43. When the engagement portion 43a is engaged in each of the range retention recesses 44 of the detent lever 30, the detent lever 30 is retained at the position of the each range. The detent lever 30 and the detent spring 43 form a detent mechanism 45 that engages and maintains the rotational position of the detent lever 30 at each range (in other words, maintaining the range switch mechanism 16 at each range).

In the P range, the parking rod 38 is displaced toward the lock lever 41, and a wide portion of the cone body 39 raises the lock lever 41. As a result, a protrusion portion 41a of the lock lever 41 engages the parking gear 40 to lock the parking gear 40. Accordingly, an output shaft of the automatic transmission 12 (in other words, the driving wheels) is held in a locked state, i.e., a parked state.

When not in the P range, the parking rod 38 is displaced away from the lock lever 41, and the wide portion of the cone body 39 is pulled out from the lock lever 41, thereby lowering the lock lever 41. As a result, the protrusion portion 41a of the lock lever 41 is disconnected from the parking gear 40 to unlock the parking gear 40. Accordingly, the output shaft of the automatic transmission 12 is maintained in a rotatable state, i.e., a movable state.

As shown in FIG. 1, the motor 27 includes an encoder 31, which is a rotation angle sensor, that detects the rotation angle (or rotation position) of a rotor of the motor 27. The encoder 31 may be, for example, a magnetic rotary encoder. The encoder 31 is synchronized with the rotation of the rotor of the motor 27, and outputs a pulse signal to the SBW-ECU 23 after every predetermined angle. The SBW-ECU 23 counts the pulse signals from the encoder 31 and, based on this count value (hereinafter referred to as an "encoder count value"), switches a conduction phase of the motor 27 in a predetermined order to drive the motor 27. As described above, the shift range of the automatic transmission 12 is changed according to the rotation angle of the motor 27. Accordingly, the encoder count value indirectly indicates the actual shift range.

Further, a rotation sensor 33 is provided to detect the rotation angle (or rotation position) of the manual shaft 29 or the detent lever 30. The rotation sensor 33 may be, for example, a potentiometer, and outputs a voltage according to the rotation angle of the manual shaft 29 or the detent lever 30. Based on this output voltage, one of the P range, R range, N range, and D range may be identified as the actual shift range.

The range selector 15 includes the operation lever 46 and a selector sensor 47. The operation lever 46 is used by the driver to select a range, and the selector sensor 47 outputs a requested range signal according the operation of the operation lever 46.

The SBW-ECU 23 switches the target range according to the requested range signal output by the range selector 15 (or more specifically, the selector sensor 47). Then, the SBW-ECU 23 uses the encoder count value to drive the motor 27 to rotate to a target rotation position (or target count value) corresponding to the target range, thereby switching the shift range to the target range.

Next, the configuration of the hydraulic control circuit 13 of the automatic transmission 12 will be explained with reference to FIGS. 4 and 5. Specifically, an explanation will be provided with respect to two of the friction engagement elements 48 which are in an engaged state when the automatic transmission is in a gear position for accelerating the vehicle from standstill (e.g., first gear).

The hydraulic control circuit 13 includes hydraulic pressure supply passages 49 which supply hydraulic pressure to each of the friction engagement elements 48 through respective hydraulic control valves 14. These hydraulic pressure supply passages 49 are connected to a pressure regulating passage 50.

The pressure regulating passage 50 includes a pressure regulating valve 56. The pressure regulating valve 56 regulates the hydraulic pressure supplied to the friction engagement elements 48 (i.e., the hydraulic pressure supplied to the hydraulic pressure supply passages 49) to be a predetermined hydraulic pressure. The predetermined pressure is lower than an engagement pressure of the friction engagement elements 48 (i.e., a hydraulic pressure for maintaining the friction engagement elements 48 in an engaged state). Specifically, the predetermined pressure is set so as to disengage the friction engagement elements 48 (e.g., into a state just before torque transmission is possible). Further, the pressure regulating passage 50 includes a check valve 57 that prevents the hydraulic oil supplied to the friction engagement elements 48 (i.e., the hydraulic oil supplied to the hydraulic pressure supply passages 49) from flowing in reverse.

Figure 4:
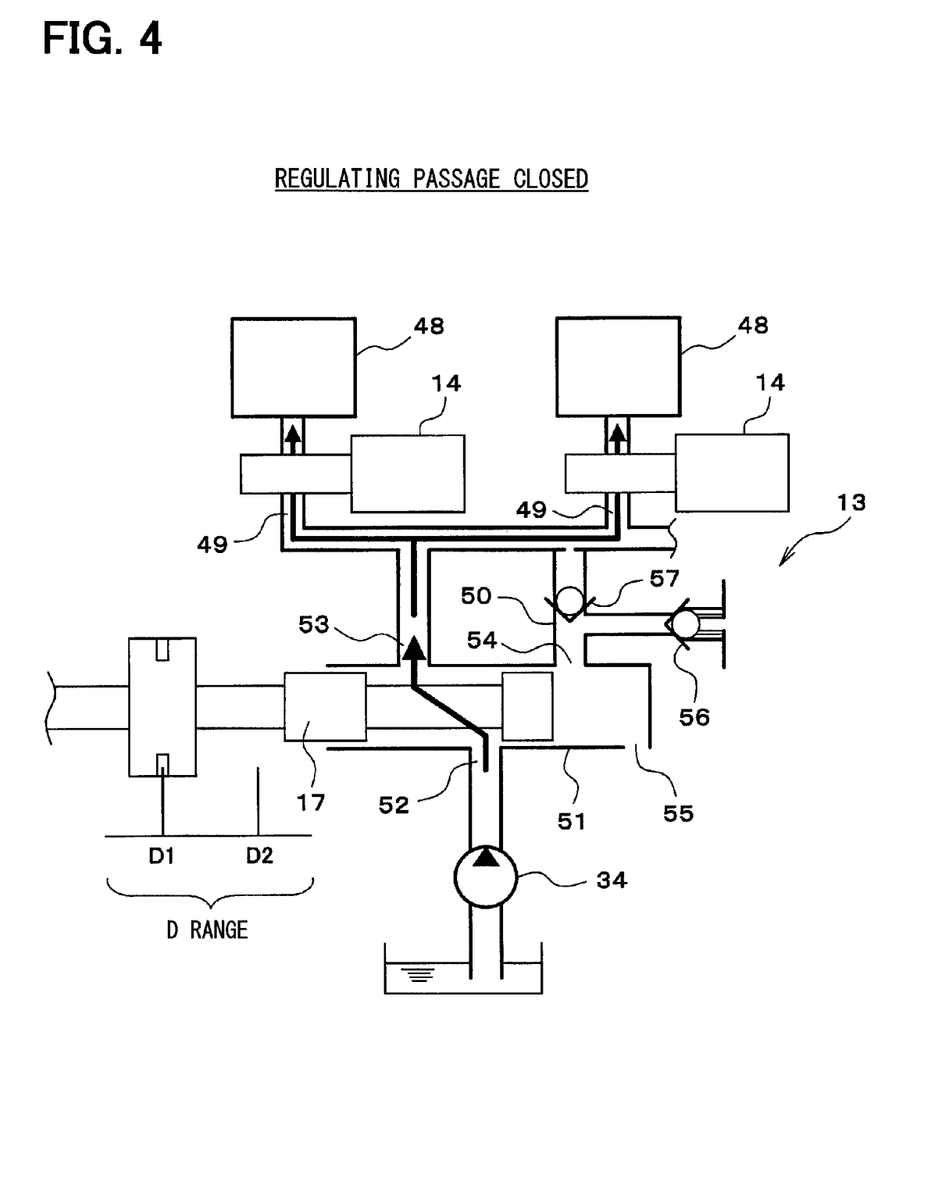
FIG. 4 is a view showing a passage switched to supply hydraulic pressure while bypassing a regulating oil passage.
Figure 5:
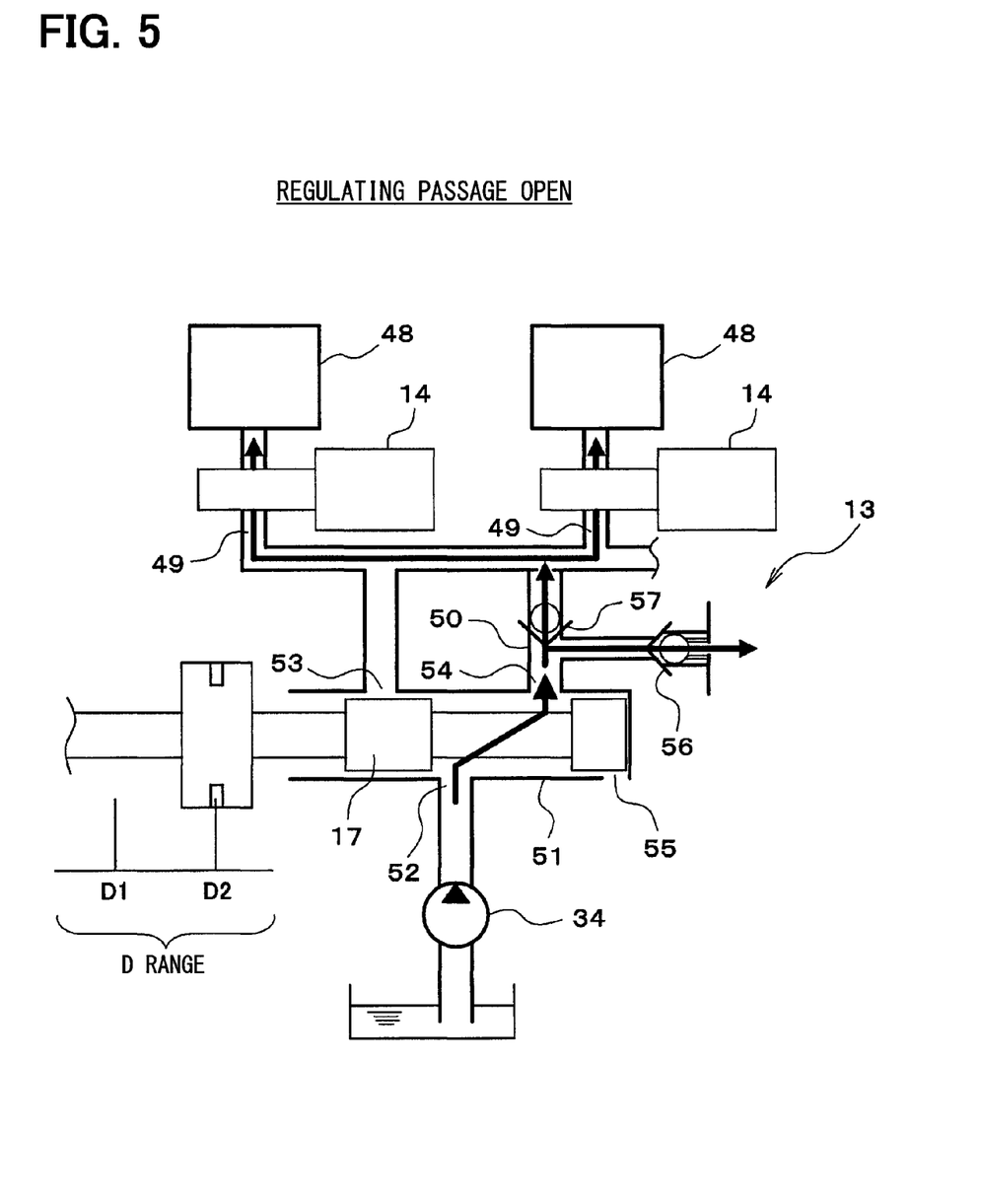
FIG. 5 is a view showing a passage switched to supply hydraulic pressure through a regulating oil passage.

When an active position of the manual valve 17 is switched, the hydraulic control circuit 13 is configured to switch between a passage that supplies hydraulic pressure to the hydraulic pressure supply passages 49 while bypassing the pressure regulating passage 50 (see FIG. 4) and a passage that supplies hydraulic pressure to the hydraulic pressure supply passages 49 through the pressure regulating passage 50 (see FIG. 5).

Specifically, a sleeve 51 of the manual valve 17 includes an input port 52, a normal port 53, a bypass port 54, and a drain port 55. Hydraulic pressure is supplied from the oil pump 34 and introduced through the input port 52. The normal port 53 is in direct fluid communication with the hydraulic pressure supply passages 49. The bypass port 54 is in fluid communication with the pressure regulating passage 50.

When the manual valve 17 is driven by the motor 27, which acts as a motive power source for the range switch mechanism 16, the manual valve 17 moves in the axial direction. Here, a D range position of the manual valve 17 includes two switchable positions, a D1 range position (i.e., when the engagement portion 43a of the detent spring 43 is engaged in the range retention recess 44 of the detent lever 30 for the D1 range) and a D2 range position (i.e., when the engagement portion 43a of the detent spring 43 is engaged in the range retention recess 44 of the detent lever 30 for the D2 range). Regardless of whether the manual valve 17 is in the D1 range position or the D2 range position, the hydraulic circuit of the automatic transmission 12 is maintained in the D range hydraulic circuit, such that the automatic transmission 12 is maintained in the D range.

As shown in FIG. 4, when the manual valve 17 moves to the D1 range position (i.e., a first operative position), an oil passage from the input port 52 to the normal port 53 is opened, and an oil passage from the input port 52 to the bypass port 54 is closed. Accordingly, a passage is switched to supply hydraulic pressure to the hydraulic pressure supply passages 49 while bypassing the pressure regulating passage 50. As a result, the hydraulic pressure introduced from the input port 52 into the sleeve 51 is supplied through the normal port 53 and the hydraulic pressure supply passages 49 to the friction engagement elements 48.

Conversely, as shown in FIG. 5, when the manual valve 17 moves to the D2 range position (i.e.: a second operative position), the oil passage from the input port 52 to the bypass port 54 is opened, and the oil passage from the input port 52 to the normal port 53 is closed. Accordingly, a passage is switched to supply hydraulic pressure to the hydraulic pressure supply passages 49 though the pressure regulating passage 50. As a result, the hydraulic pressure introduced from the input port 52 into the sleeve 51 is supplied through the bypass port 54 and the pressure regulating passage 50, and thereafter through the hydraulic pressure supply passages 49, to be supplied to the friction engagement elements 48. In this case, the pressure regulating valve 56 regulates the hydraulic pressure supplied to the friction engagement elements 48 to be the predetermined pressure which is lower than the engagement pressure. At the same time, the check valve 57 prevents reverse flow of the hydraulic oil supplied to the friction engagement elements 48. Accordingly, the hydraulic pressure applied to the friction engagement elements 48 is maintained at the predetermined pressure which is lower than the engagement pressure.

Further, in the present embodiment, the SBW-ECU 23 performs the following control operation by executing an oil passage switch control routine shown in FIG. 6, which will be described later.

Specifically, the SBW-ECU 23 determines whether the vehicle is stopped while the automatic transmission 12 is in a D range, i.e., a driving range (hereinafter, this condition will be referred to as being "D-range parked"). If the vehicle is determined as not D-range parked, the operative position of the manual valve 17 is switched to the D1 range position. If the vehicle is determined to be D-range parked, the operative position of the manual valve 17 is switched to the D2 range position.

Figure 7B:
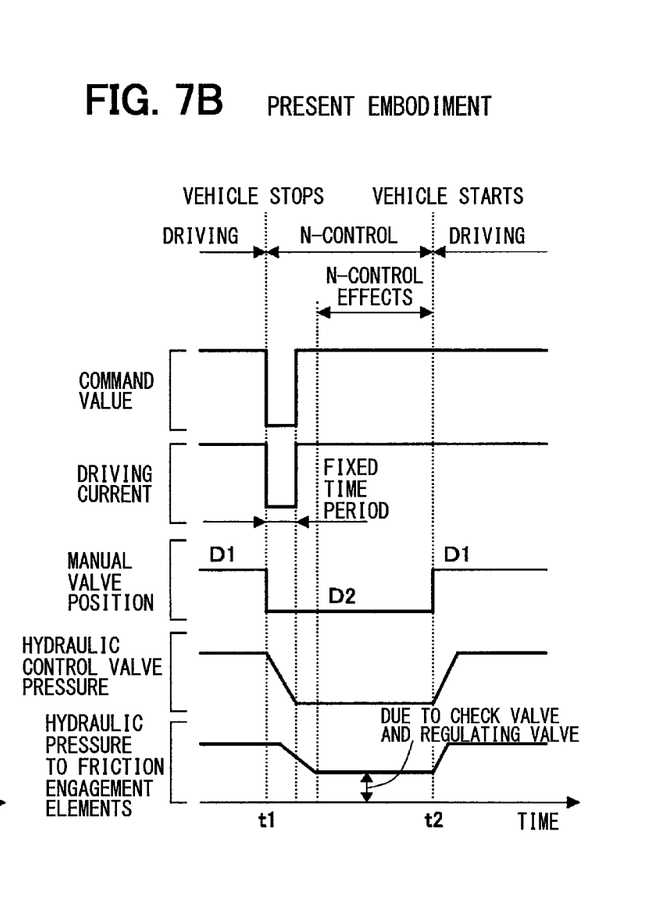
FIG. 7B is a time chart for explaining effects of an embodiment.

Specifically, as shown in FIG. 7B, when the automatic transmission 12 is in the D range and the vehicle is driving, it is determined that the vehicle is not D-range parked. Then, when the vehicle is determined as not D-range parked, the operative position of the manual valve 17 is maintained in the D1 range position. Accordingly, the control process maintains the passage supplying hydraulic pressure to the hydraulic pressure supply passages 49 while bypassing the pressure regulating passage 50, and the hydraulic control valves 14 are able to normally control the hydraulic pressure applied to the friction engagement elements 48. For example, if the automatic transmission 12 is in the first gear position, the driving current of the hydraulic control valves 14 is controlled to apply the engagement pressure to the friction engagement elements 48 such that the friction engagement elements 48 are engaged.

Thereafter, when the automatic transmission 12 is in the D range and the vehicle comes to a stop, it is determined that the vehicle is D-range parked.

Then, when the vehicle is determined as being D-range parked at time t1, the operative position of the manual valve 17 is switched to the D2 range position. Accordingly, the control process switches to the passage supplying hydraulic pressure to the hydraulic pressure supply passages 49 through the pressure regulating passage 50. As a result, the N-control process is performed, in which the pressure regulating valve 56 regulates the hydraulic pressure applied to the friction engagement elements 48 to be the predetermined pressure which is lower than the engagement pressure, so as to disengage the friction engagement elements 48.

Further, when the operative position of the manual valve 17 is switched to the D2 range position, the driving current of the hydraulic control valves 14 is controlled to perform the pressure reduction control process for a fixed period of time, which reduces the hydraulic pressure applied to the friction engagement elements 48. As a result, the hydraulic pressure applied to the friction engagement elements 48 is quickly reduced to be around the predetermined pressure.

Thereafter, when a driver begins to drive the vehicle (for example, by releasing the brakes), it is determined that the vehicle is not D-range parked. When it is determined that the vehicle is not D-range parked, then at time t2, the operative position of the manual valve 17 is switched to the D1 range position. Accordingly, the control process switches to the passage supplying hydraulic pressure to the hydraulic pressure supply passages 49 while bypassing the pressure regulating passage 50. As a result, the N-control process is terminated, and the hydraulic control valves 14 are once again able to normally control the hydraulic pressure applied to the friction engagement elements 48. For example, if the automatic transmission 12 is to be switched to the first gear position, the driving current of the hydraulic control valves 14 is controlled to apply the engagement pressure to the friction engagement elements 48 such that the friction engagement elements 48 become engaged.

Next, the details of the oil passage switch control routine performed by the SBW-ECU 23 will be explained with reference to FIG. 6.

Figure 6:
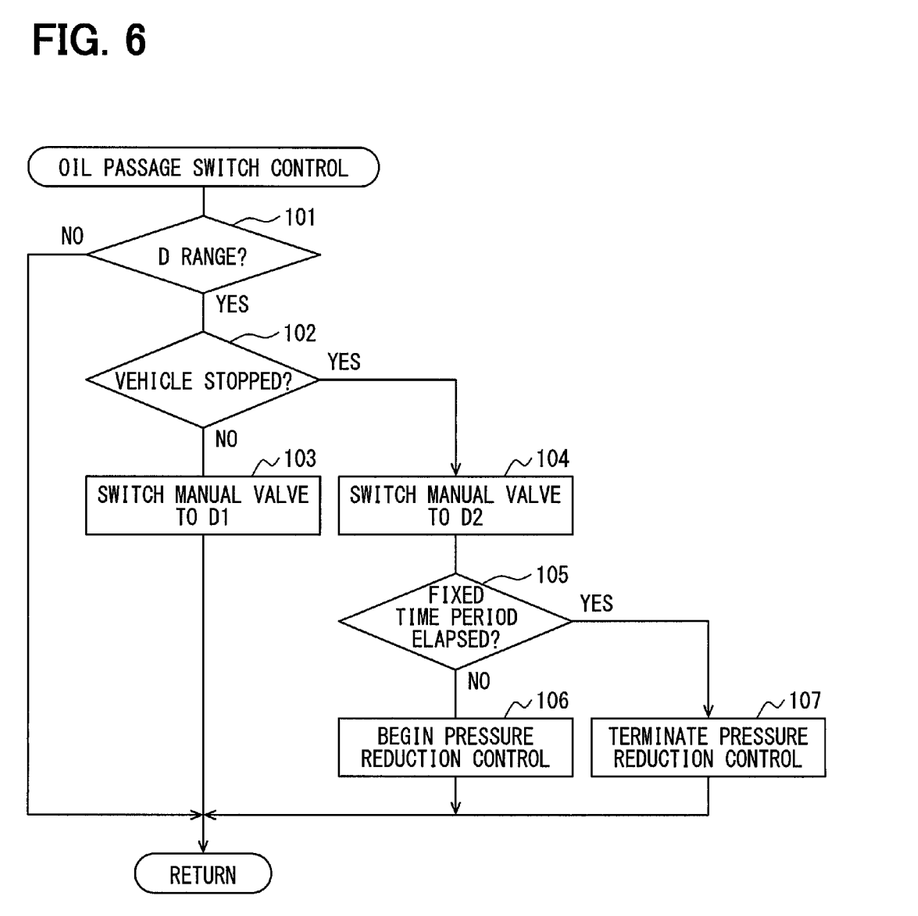
FIG. 6 is a flow chart showing the processing flow of an oil passage switch control routine.

When the SBW-ECU 23 is powered on (i.e., when the ignition switch is on), the SBW-ECU 23 periodically and repeatedly performs the oil passage switch control routine of FIG. 6. As such, the SBW-ECU 23 acts as a control unit. The present control routine beings at step 101, where it is determined whether the current shift range is the D range (i.e., whether the manual valve 17 is in the D range position). At step 101, if it is determined that the current shift range is not the D range, the processing of step 102 and beyond is not performed, and the present control routine terminates.

Conversely, if it is determined at step 101 that the current shift range is the D shift range, then the control routine continues to step 102. At step 102, it is determined whether the vehicle is D-range parked. For example, this may be determined based on whether the vehicle is stopped and the brakes are engaged (i.e., the brake pedal is depressed).

At step 102, if it is determined that the vehicle is not D-range parked, then the control routine proceeds to step 103. At step 103, the operative position of the manual valve 17 is switched to the D1 range position, thereby switching to the passage which supplies hydraulic pressure to the hydraulic pressure supply passages 49 while bypassing the pressure regulating passage 50. Accordingly, the hydraulic control valves 14 are able to normally control the hydraulic pressure applied to the friction engagement elements 48 to switch gear positions.

Conversely, if it is determined at step 102 that the vehicle is D-range parked, then the control routine proceeds to step 104. At step 104, the operative position of the manual valve 17 is switched to the D2 range position, thereby switching to the passage which supplies hydraulic pressure to the hydraulic pressure supply passages 49 through the pressure regulating passage 50. As a result, the N-control process is performed, in which the pressure regulating valve 56 regulates the hydraulic pressure applied to the friction engagement elements 48 to be the predetermined pressure which is lower than the engagement pressure, so as to disengage the friction engagement elements 48.

Thereafter, the control routine proceeds to step 105, where it is determined whether a fixed period of time has elapsed since switching the operative position of the manual valve 17 to the D2 range position. This fixed period of time may be set as, for example, the amount of time needed for the pressure reduction control process to reduce the hydraulic pressure applied to the friction engagement elements 48 to be around the predetermined pressure. In the present embodiment, a time map (not illustrated) may be used to set the fixed period of time based on the temperature of the hydraulic oil. When the hydraulic oil temperature is low (in other words, the hydraulic oil viscosity is high), the amount of time needed for the pressure reduction control process to reduce the hydraulic pressure applied to the friction engagement elements 48 to be around the predetermined pressure is high. Accordingly, this time map may be set such that as the hydraulic oil temperature decreases, the fixed period of time increases. The time map may be created beforehand based on experimental data, calculations, or the like, and is stored in a ROM of the SBW-ECU 23.

At step 105, when it is determined that the fixed period of time has not elapsed, the control routine proceeds to step 106. At step 106, the pressure reduction control process is performed to control the hydraulic control valves 14 such that the hydraulic pressure applied to the friction engagement elements 48 is reduced. Thereafter, when it is determined at the above described step 105 that the fixed period of time has elapsed, the control routine proceeds to step 107, and the pressure reduction control process is terminated. As a result of the processing of the steps 105 to 107, the pressure reduction control process is performed for the fixed period of time when the operative position of the manual valve 17 is switched to the D2 range position.

FIG. 7A shows a reference example automatic transmission including a hydraulic control system. Specifically, when a vehicle is stopped while a transmission is in the D range, the hydraulic control system waits until the line pressure stabilizes. Then, an N-control process is performed on a hydraulic control valve such that the hydraulic pressure applied to friction engagement elements is reduced and the friction engagement elements become disengaged. In this case, the start timing of the N-control process is delayed, and the friction engagement elements are maintained in the disengaged state for a reduced amount of time (i.e., the effects of the N-control process are conferred for a reduced amount of time). As a result, the N-control process is unable to sufficiently reduce energy losses.

In contrast, according to the present embodiment, the pressure regulating passage 50 is provided, which includes the pressure regulating valve 56 and the check valve 57. The pressure regulating valve 56 regulates the hydraulic pressure supplied to the friction engagement elements 48 to be the predetermined pressure which is lower than the engagement pressure. The check valve 57 prevents reverse flow of the hydraulic oil supplied to the friction engagement elements 48. Further, when the active position of the manual valve 17 is switched, the oil passage switch routine switches between the passage that supplies hydraulic pressure to the hydraulic pressure supply passages 49 while bypassing the pressure regulating passage 50 and the passage that supplies hydraulic pressure to the hydraulic pressure supply passages 49 through the pressure regulating passage 50.

By switching to the passage that supplies hydraulic pressure to the hydraulic pressure supply passages 49 while bypassing the pressure regulating passage 50, the hydraulic control valves 14 are able to normally control the hydraulic pressure applied to the friction engagement elements 48. Conversely, by switching to the passage that supplies hydraulic pressure to the hydraulic pressure supply passages 49 through the pressure regulating passage 50, the friction engagement elements 48 may be disengaged by the pressure regulating valve 56, which regulates the hydraulic pressure applied to the friction engagement elements 48 to be the predetermined pressure which is lower than the engagement pressure.

Accordingly, as shown in FIG. 7B, when the automatic transmission 12 is in the D range and the vehicle stops, regardless of the line pressure, the oil passage switch routine switches to the passage that supplies hydraulic pressure to the hydraulic pressure supply passages 49 through the pressure regulating passage 50, and the N-control process may be performed, in which the pressure regulating valve 56 regulates the hydraulic pressure applied to the friction engagement elements 48 to be the predetermined pressure which is lower than the engagement pressure, so as to disengage the friction engagement elements 48. As a result, when the automatic transmission 12 is in the D range and the vehicle stops, it is not necessary to wait for the line pressure to stabilize. Instead, the N control process, which disengages the friction engagement elements 48, may be started early. Thus, the friction engagement elements may be maintained in the disengaged state for an increased amount of time (i.e., the effects of the N-control process are conferred for an increased amount of time). As a result, reduction in energy losses by the N-control process may be improved.

Moreover, the motor 27, which is a motive power source for the range switch mechanism 16, is used to switch the operative position of the manual valve 17 to switch the passage that supplies hydraulic pressure to the hydraulic pressure supply passages 49. As a result, is not necessary to provide a dedicated motive power source for switching the passage that supplies hydraulic pressure to the hydraulic pressure supply passages 49, and the system may further satisfy low cost and energy efficiency demands.

Further, in the present embodiment, it is determined whether the vehicle is D-range parked (i.e., when the automatic transmission 12 is in the D-range and the vehicle is stopped). It the vehicle is determined to not be D-range parked, the operative position of the manual valve 17 is switched to the D1 range position. If the vehicle is determined to be D-range parked, the operative position of the manual valve 17 is switched to the D2 range position.

Accordingly, if it is determined that the vehicle is not D-range parked, then the operative position of the manual valve 17 is switched to the D1 range position, thereby switching to the passage which supplies hydraulic pressure to the hydraulic pressure supply passages 49 while bypassing the pressure regulating passage 50. Accordingly, the hydraulic control valves 14 are able to normally control the hydraulic pressure applied to the friction engagement elements 48 to switch gear positions.

Conversely, if it is determined that the vehicle is D-range parked, then the operative position of the manual valve 17 is switched to the D2 range position, thereby switching to the passage which supplies hydraulic pressure to the hydraulic pressure supply passages 49 through the pressure regulating passage 50. As a result, the N-control process is performed, in which the pressure regulating valve 56 regulates the hydraulic pressure applied to the friction engagement elements 48 to be the predetermined pressure which is lower than the engagement pressure, so as to disengage the friction engagement elements 48 and reduce energy losses.

Further, in the present embodiment, when the operative position of the manual valve 17 is switched to the D2 range position, the hydraulic control valves 14 are controlled to perform the pressure reduction control process, which reduces the hydraulic pressure applied to the friction engagement elements 48, for only a fixed period of time. Accordingly, when the operative position of the manual valve 17 is switched to the D2 range position and the N-control process begins, the hydraulic pressure applied to the friction engagement elements 48 may be quickly reduced to be around the predetermined pressure by the pressure reduction control process.

In this case, according to the present embodiment, the fixed period of time is set according to the hydraulic oil temperature. This is because, when performing the pressure reduction control process, the amount of time needed for the hydraulic pressure applied to the friction engagement elements 48 to reduce to be around the predetermined pressure changes according to the hydraulic oil temperature. Therefore, the fixed period of time may be set to an appropriate value based on the hydraulic oil temperature (i.e., the hydraulic oil viscosity). As a result, the present embodiment avoids a case where the fixed period of time (i.e., the amount of time that the pressure reduction control process is performed for) is longer than necessary.

Further, in the above described embodiment, the fixed period of time is set according to the hydraulic oil temperature, but the present disclosure is not limited to this example. For example, the fixed period of time may be set as a fixed value in advance in order to reduce calculation load.

Further, in the above described embodiment, the SBW-ECU 23 performs the control routine of FIG. 6. However, the above described embodiment is not limited to this, and an ECU other than the SBW-ECU 23 (e.g., the AT-ECU 22 or the engine ECU 18) may perform the control routine of FIG. 6 instead.

Further, the above described embodiment is applied to a system including a range switch mechanism that switches between four shift ranges: the P range, the R range, the N range, and the D range. However, the above described embodiment of the present disclosure may instead be applied to a system including a range switch mechanism that switches between two shift ranges: a P range and a "not P" range. Further, the above described embodiment of the present disclosure may also be applied to a system including a range switch mechanism that switches between three shift ranges, or between five or more shift ranges. Further, the above described embodiment of the present disclosure may also be applied to a system including a range switch mechanism that switches a transmission up and down using an electric actuator (e.g., a solenoid).

The invention claimed is:

1. A transmission hydraulics controller for a transmission including i) a manual valve that switches a hydraulic circuit for hydraulic oil of a friction engagement element of the transmission, ii) a hydraulic control valve that controls a hydraulic pressure applied to the friction engagement element, and iii) a range switch mechanism that is driven by an electric actuator and switches an operative position of the manual valve to switch a range of the transmission, the transmission hydraulics controller comprising:

a hydraulic pressure supply passage that supplies hydraulic pressure to the friction engagement element through the hydraulic control valve; and a pressure regulating passage that includes
a pressure regulating valve that regulates the hydraulic pressure supplied to the friction engagement element to be a predetermined pressure, the predetermined pressure being lower than an engagement pressure of the friction engagement element, and
a check valve that prevents reverse flow of hydraulic oil supplied to the friction engagement element, wherein the operative position of the manual valve is switched so as to switch between
a passage that supplies hydraulic pressure to the hydraulic pressure supply passage while bypassing the pressure regulating passage, and
a passage that supplies hydraulic pressure to the hydraulic pressure supply passage through the pressure regulating passage.

2. The transmission hydraulics controller of claim 1, further comprising:

a control unit that determines whether a vehicle is D-range parked by determining whether the transmission is in a drive range and the vehicle is stopped,
when it is determined that the vehicle is not D-range parked, switch the operative position of the manual valve to a first operative position, thereby switching to the passage that supplies hydraulic pressure to the hydraulic pressure supply passage while bypassing the pressure regulating passage, and
when it is determined that the vehicle is D-range parked, switch the operative position of the manual valve to a second operative position, thereby switching to the passage that supplies hydraulic pressure to the hydraulic pressure supply passage through the pressure regulating passage, wherein
the friction engagement element is engaged when the transmission is in a gear position for accelerating the vehicle from standstill.

3. The transmission hydraulics controller of claim 2, wherein the control unit is configured to, when switching the operative position of the manual valve to the second operative position, perform a pressure reduction control process for a fixed period of time, and
the pressure reduction control process includes controlling the hydraulic control valve to reduce a hydraulic pressure applied to the friction engagement element.

4. The transmission hydraulics controller of claim 3, wherein the control unit is configured to set the fixed period of time according to a temperature of the hydraulic oil.

5. The transmission hydraulics controller of claim 1, wherein the electric actuator is a motor,
the range switch mechanism includes a detent lever fixed to a manual shaft, the manual shaft being coupled to a rotating shaft of the motor, and
the manual valve is coupled to the detent lever so as to linearly move according to a rotation of the detent lever.

* * * * *